United States Patent [19]
Cole

[11] Patent Number: 5,232,599
[45] Date of Patent: Aug. 3, 1993

[54] DISPOSABLE SLUDGE DEWATERING CONTAINER AND METHOD

[76] Inventor: Clifford M. Cole, 1905 Cottonwood Dr., Aiken, S.C. 29803

[21] Appl. No.: 884,313

[22] Filed: May 11, 1992

Related U.S. Application Data

[63] Continuation of Ser. No. 634,626, Dec. 27, 1990, abandoned.

[51] Int. Cl.⁵ ............................................. C02F 3/00
[52] U.S. Cl. ................................. 210/609; 210/807; 210/290; 210/406
[58] Field of Search ............... 210/289, 290, 291, 406, 210/609, 807

[56] References Cited

U.S. PATENT DOCUMENTS

| | | | |
|---|---|---|---|
| 2,816,664 | 12/1957 | Haynes | 210/460 |
| 3,011,643 | 12/1961 | McCoy | 210/289 X |
| 3,557,961 | 1/1971 | Stuart | 210/290 X |
| 4,107,044 | 8/1978 | Levendusky | 210/266 |
| 4,382,863 | 5/1983 | Riise | 210/702 |
| 4,426,020 | 1/1984 | Presseau, et al. | 222/108 |
| 4,447,332 | 5/1984 | Crisman et al. | 210/290 X |
| 4,448,690 | 5/1984 | Maphis | 210/609 |
| 4,668,388 | 5/1987 | Dibble et al. | 210/150 |
| 4,749,479 | 6/1988 | Gray | 210/170 |
| 4,783,261 | 11/1988 | Lingle | 210/290 |

Primary Examiner—Charles Hart
Attorney, Agent, or Firm—Harold M. Dixon; William R. Moser; Richard E. Constant

[57] ABSTRACT

A device and method for preparing sludge for disposal comprising a box with a thin layer of gravel on the bottom and a thin layer of sand on the gravel layer, an array of perforated piping deployed throughout the gravel layer, and a sump in the gravel layer below the perforated piping array. Standpipes connect the array and sump to an external ion exchanger/fine particulate filter and a pump. Sludge is deposited on the sand layer and dewatered using a pump connected to the piping array, topping up with more sludge as the aqueous component of the sludge is extracted. When the box is full and the free standing water content of the sludge is acceptable, the standpipes are cut and sealed and the lid secured to the box.

20 Claims, 1 Drawing Sheet

DISPOSABLE SLUDGE DEWATERING CONTAINER AND METHOD

The United States Government has rights in this invention pursuant to Contract No. DE-AC09-89SR18035 between the U.S. Department of Energy and Westinghouse Savannah River Company.

This is a continuation of application Ser. No. 07/634,626 filed Dec. 27, 1990, abandoned.

BACKGROUND OF THE INVENTION

1. Field of the Invention:

The present invention relates to the dewatering of sludge. In particular, the present invention relates to disposable containers for sludge dewatering.

2. Discussion of Background:

Industrial processes sometimes produce wastes in the form of sludges. For both structural and environmental stability and volume reduction purposes, it is usually desirable to separate the aqueous phase, or other, non-aqueous liquid phase, from the solid phase before disposal. Frequently, separation is accomplished by evaporating the water from sludge placed in large settling ponds. At other times, more aggressive techniques are used, including filter pressing that exert substantial pressure on the sludge and thereby reduce the moisture content dramatically and quickly. Another technique is the use of water extraction through layers of filtering materials using a pump to provide suction. A sand layer followed by a gravel layer is known in this technique. See the device described by Riise in U.S. Pat. No. 4,382,863, for example.

Certain types of waste require special handling. In particular, hazardous and radioactive wastes may pose health risks and therefore, special precautions are taken to reduce the exposure of workers to these materials. Levendusky discloses a container for processing and disposal of radioactive wastes in U.S. Pat. No. 4,107,044. In his container, he deploys a network of perforated pipes deployed throughout a quantity of resin beads. Aqueous, radioactive wastes are pumped into the container, and the liquid removed through the pipes. The radioactive ions in the water adhere to the resin beads and remain in the container. When the beads saturate, the container is sealed and transported to a disposal site for burial.

There is considerable political and economic pressure to reduce the volume of wastes, especially "low-level" radioactive wastes. Disposal costs increased dramatically making it important to minimize the amount of waste disposed and, equivalently, assure that as much waste volume per unit container volume is disposed of as possible.

Thus, handling of low-level radioactive wastes must be minimized and the amount of waste per container maximized.

SUMMARY OF THE INVENTION

According to its major aspects, the present invention is a device and method for preparing sludge for disposal. The device comprises a container, such as a box, with a thin layer of gravel on the bottom and a thin layer of sand on top of the gravel layer. An array of perforated pipes is deployed throughout the gravel layer and a sump is located in a corner of the box below the perforated piping. Standpipes connect the array and the sump to a pumping system for extracting any water entering the gravel layer.

Sludge is deposited on top of the sand layer and dewatered using the pump to create suction in the perforated piping and the sump. Additional sludge is added as the water is extracted to top off the container. When the sludge has been dewatered to the point where its remaining free standing water content is acceptable for disposal, the standpipes are cut and sealed and the container lid is attached. The container with sludge and sand and gravel layers is disposed of without further processing.

Although using sand and gravel layers to filter and dewater sludge is not new, the layers in the present invention, being both between 4 and 7 centimeters in a preferred embodiment, are surprisingly thin. This feature allows more space in the container for waste.

A feature of the present invention is the dewatering of the sludge in the same container that will be used for disposal. This feature reduces handling and therefore exposure of employees to the risk of the chemical or radioactive hazard of the sludge.

Other features and advantages of the present invention will be apparent to those skilled in the art from a careful reading of the Detailed Description of a Preferred Embodiment presented below and accompanied by the drawings.

DETAILED DESCRIPTION OF A PREFERRED EMBODIMENT

Figure 1:
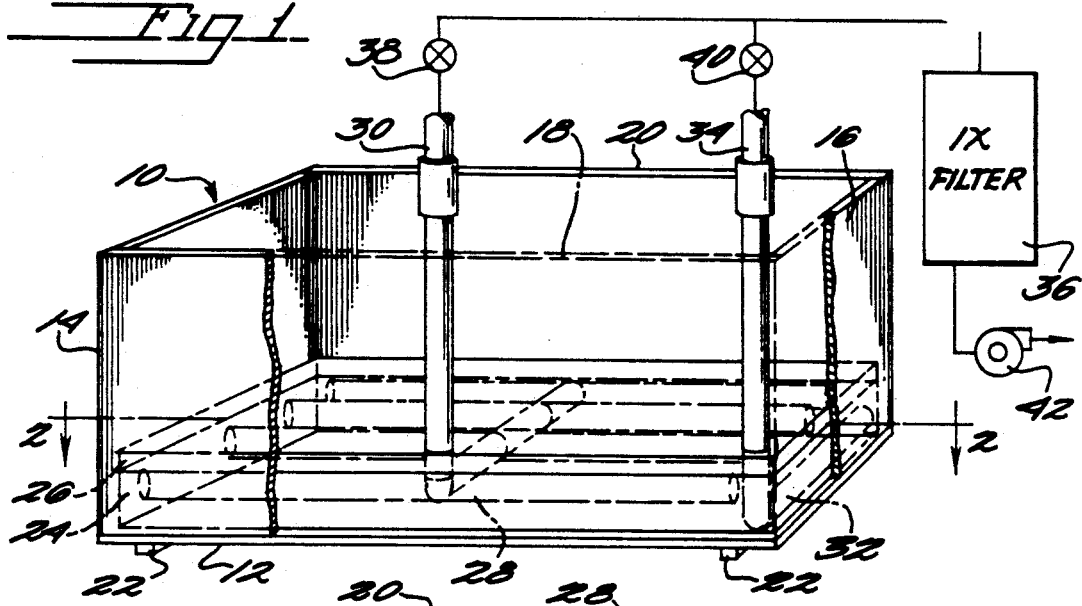
FIG. 1 is a partially cut away, perspective view of a device according to a preferred embodiment of the present invention.

Referring now to FIG. 1, there is illustrated a device according to the present invention. The device is a box 10 having a bottom 12, and four sides 14, 16, 18, and 20. Box 10 is preferably placed on supports 22 to allow lifting of box 10 by a fork lift or crane (not shown). Inside box 10 are two layers of material, a first layer 24 on bottom 12 and a second layer 26 on first layer 24. The compositions of layers 24 and 26 will be described below.

In first layer 24 is an array of piping 28 deployed outwardly from a first standpipe 30. Also in first layer 24 is a second pipe 32 communicating with a second standpipe 34. Array 28 is positioned slightly above second pipe 32 and second pipe is preferably near bottom 12 of box 10, below array 28. First and second standpipes 30 and 34 are connected to an ion exchanger/filter 36 through two valves 38 and 40, respectively, and to a pump 42. Alternatively, instead of an ion exchanger/filter 36, a vacuum filtrate collector can be substituted to remove particulate.

Figure 2:
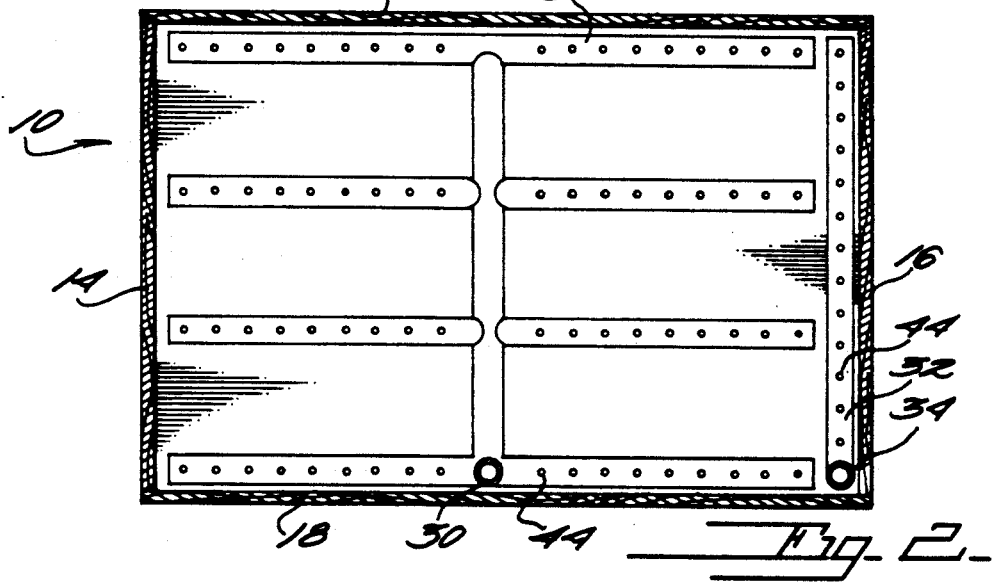
FIG. 2 is an overhead plan view of the device as shown in FIG. 1.

FIG. 2 is a top plan view of box 10 showing array 28 and second pipe 32. The individual pipes of array 28 and second pipe 32 have perforations 44 to admit water but prevent access of the material of first layer 24.

Figure 3:
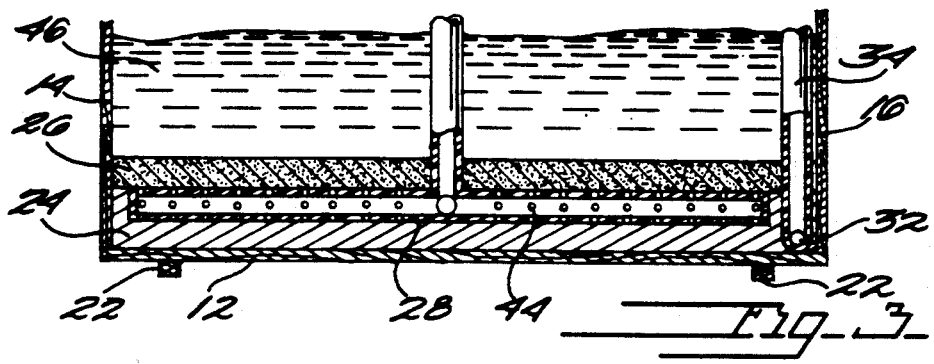
FIG. 3 is a detailed cross sectional view of the device of FIG. 1.

FIG. 3 is a detailed cross sectional view of box 10 with first layer 24 and second layer 26. First layer 24 is preferably composed of a coarse material, such as gravel, that will allow water, or other liquid to pass through quickly but provide support for maintaining the positions of the pipes of array 28 and second pipe 32. First layer 24 is preferably just thick enough to position array 28 and second pipe 32, typically 4 to 7 centimeters thick is sufficiently thick. Although a thicker layer will also perform well, the additional volume of the thicker layer eliminates volume that could otherwise be taken up by waste. The gravel used is typically in the size range of about ¼" to 1 ½" but we prefer those of about ½" to 1 ¼" in size.

Second layer 26 is composed of a fine, granular material such as sand, and acts as a filter of water or other liquid. Sand and gravel are both inexpensive and relatively inert to water with or without impurities. Other materials, synthetic or natural, such as glass beads of two different sizes, or other waste materials in the preferred sizes, can be used in lieu of sand and gravel. The fine, granular material can be a widely available inexpensive standard construction sand which passes through a sieve size of about 8 to 200. We prefer sand in the range passing through a sieve size of about 10 to 100.

Above second layer is deposited the sludge 46. The aqueous phase of the sludge will be extracted by a vacuum created by pump 42, drawing water into array 28 and second pipe 32 through their perforations 44 and up through first and second standpipes 30, 34, respectively. Any ions or very fine particulate in the water will be absorbed onto the ion exchange resin in ion exchanger/filter 36. As water is removed from sludge 46, its volume is reduced and additional sludge may be deposited in box 10. When box 10 is filled and dewatered until the amount of free standing water is acceptable, usually less than one percent by volume, standpipes 30 and 34 are cut and sealed, and a lid is placed onto box 10 and secured to walls 14, 16, 18, and 20. It may be desirable to tilt box 10 so that second pipe 32 is at the lowest end of box and second standpipe 34 is at the lowest corner of box 10 to facilitate removal of small amounts of water remaining in first layer 24.

Box 10 is preferably made of a material suitable for disposal of the type of waste materials contained. For example, for low specific activity (LSA) wastes, a box made of plywood, reinforced for strength is sufficient but a steel box is preferred. The piping can be made of polyvinyl chloride (PVC) which is readily available and easy to fashion in the desire array and to work with generally.

It will be apparent to those skilled in the art that many changes and substitutions can be made to the preferred embodiment herein described without departing from the spirit and scope of the present invention which is defined by the appended claims.

What is claimed is:

1. A method for preparing sludge for disposal, comprising the steps of:
   providing a layer of granular material over a layer of coarser material in the bottom of a disposable container;
   providing conduit means in said coarser material for extracting water from said layer of coarser material;
   depositing said sludge on said layer of granular material;
   extracting water through said conduit means by vacumming;
   sealing said conduit means; and
   sealing said container.

2. The method as recited in claim 1, wherein said water is extracted until there is less than one percent free standing water in said container.

3. The method as recited in claim 1, further comprising the steps of:
   providing a sump in the bottom of said container; and
   extracting additional water from said sump.

4. The method as recited in claim 3, further comprising the step of tilting said container so that said sump is the lowest point of said container before extracting said additional water.

5. The method as recited in claim 1, wherein said granular material is sand.

6. The method as recited in claim 1, wherein said coarser material is gravel.

7. The method as recited in claim 1, wherein said granular material is sand and said coarser material is gravel.

8. The method as recited in claim 1, wherein said layer of granular material is between 4 and 7 centimeters in thickness.

9. The method as recited in claim 8, wherein said layer of coarser material is between 4 and 7 centimeters in thickness.

10. The method as recited in claim 1, wherein said conduit means further comprises an array of perforated pipes deployed from a standpipe, said standpipe in communication with the exterior of said container.

11. A device for preparing sludge for disposal, said device comprising:
    a disposable container;
    a first layer by vacumming of a coarse material on the bottom of said container;
    a second layer of a granular material on said first layer;
    conduit means deployed within said first layer for extracting water from said first layer.

12. The device as recited in claim 11, further comprising sump means in said first layer positioned below said conduit means.

13. The device as recited in claim 11, wherein said first layer is gravel and said second layer is sand.

14. The device as recited in claim 12, wherein said first layer is between 4 and 7 centimeters thick.

15. The device as recited in claim 14, wherein said second layer is between 4 and 7 centimeters thick.

16. The device as recited in claim 11, wherein said conduit means further comprises an array of perforated pipes deployed throughout said first layer.

17. A device for preparing and disposing radioactive sludge, the device comprising:
    a wooden box;
    a layer of gravel on the bottom of said box;
    a layer of sand on said layer of gravel;
    an array of perforated piping deployed throughout said layer of gravel;
    a sump in said layer of gravel positioned below said array of piping; and
    means for vacumming water from said array and said sump.

18. The device as recited in claim 17, wherein said sand layer is between 4 and 7 centimeters thick.

19. The device as recited in claim 17, wherein said gravel layer is between 4 and 7 centimeters thick.

20. The device as recited in claim 17, wherein said extracting means further comprises:
    a first standpipe in communication with said array;
    a second standpipe in communication with said sump; and
    pump means in operative connection with said first and said second stand pipes,
    said gravel being in the size range of about ¼" to 1 ½";
    and said sand being in the size range of about 8 to 200 mesh.

* * * * *